Dec. 30, 1924. 1,521,475
F. PURDY
CIRCULATING SYSTEM
Filed May 5, 1921
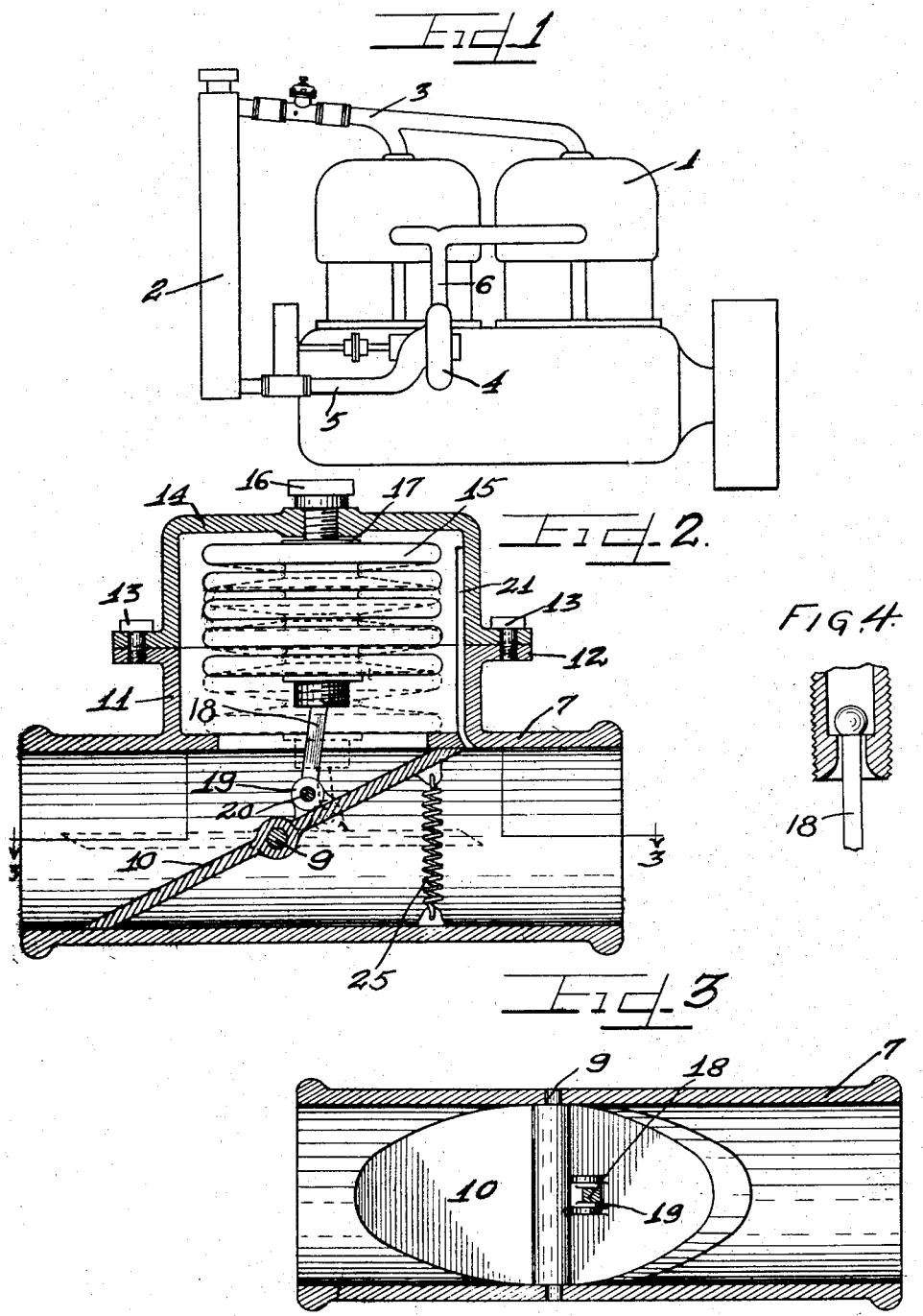

Patented Dec. 30, 1924.

1,521,475

UNITED STATES PATENT OFFICE.

FREDERICK PURDY, OF CHICAGO, ILLINOIS.

CIRCULATING SYSTEM.

Application filed May 5, 1921. Serial No. 467,048.

*To all whom it may concern:*

Be it known that I, FREDERICK PURDY, a citizen of the United States, and a resident of the city of Chicago, in the county of Cook and State of Illinois, have invented certain new and useful Improvements in a Circulating System; and I do hereby declare that the following is a full, clear, and exact description of the same, reference being had to the accompanying drawings, and to the numerals of reference marked thereon, which form a part of this specification.

This invention relates to a circulating system and particularly to a thermostatically controlled circulating cooling system for internal combustion engines wherein the thermostatic operating element is isolated from the direct pressure of the fluid in the system.

Thermo-sensitive operating elements of the type preferably employed in circulating systems ordinarily comprise a collapsible metallic vessel in which a volatile liquid is maintained under subatmospheric pressure at normal temperatures so that the vessel is collapsed at such temperature. Upon a rise in temperature in the fluid surrounding the vessel the same becomes heated and the consequent vaporization of the liquid in the vessel causes an increase in pressure which effects the expansion thereof.

This expansion of the thermo-sensitive element is utilized to operate a valve which controls the progress of fluid in the circulating system, and in order that the vessel may expand to open the valve at the proper temperature it is, of course, necessary that the volatile liquid be sealed in the vessel under a definite subatmospheric pressure. Such a definite pressure may be accurately and conveniently attained, but the external pressure of the fluid in the circulating system which is produced by a pump in the circulating system is varied so much by variations in the engine speed that the action of the thermo-sensitive element is seriously impaired when subjected to such external pressure. These variations in pressure are also increased by differences in operation of the pump itself and it is therefore desirable that the thermo-sensitive element be so positioned that it may expand unaffected by the pressure of the circulating fluid.

It is an important object therefore of the present invention to provide a thermostatically controlled circulating system wherein the thermostatic controlling element is isolated from the direct pressure of the fluid in the circulating system.

It is also an important object of this invention to provide a thermostatically controlled circulating system wherein a pressure operated thermostat is positioned to be affected by the temperature but not the pressure of the circulating fluid.

Other and further important objects of this invention will be apparent from the disclosures in the specification and the accompanying drawings.

The invention (in a preferred form) is shown on the drawings and hereinafter more fully described.

On the drawings:

Figure 1 is a side elevation of an internal combustion engine equipped with the improved thermostatically controlled circulating cooling system of this invention.

Figure 2 is a longitudinal central section through the thermostatically operated controlling mechanism.

Figure 3 is a section on the line 3—3 of Figure 2, and Figure 4 is a detail sectional view showing the slip joint connection.

As shown on the drawings:

The device of this invention is employed to control the flow of a cooling liquid through the circulating system of an internal combustion engine 1. Said circulating system comprises a usual radiator 2 which is connected with the engine 1 through a conduit 3 connected in the water-jacket of said engine, the circulation being maintained by a pump 4 which is connected with the lower side of the radiator by means of the conduit 5 and which has a delivery conduit 6 leading to the water-jackets of the engine.

In order that the engine may operate at its highest efficiency it is desirable that it be brought to the proper operating temperature as soon as possible after starting. This is best effected by cutting off the flow of the circulating cooling fluid until the desired temperature is attained and the mechanism for accomplishing this result will now be described. Connected in the conduit 3 between the upper side of the engine 1 and the upper side of the radiator, is a chambered casing 7 which is provided with an opening 8 in its upper side and which has pivotally mounted therein, on a transverse axis 9, a valve 10 which acts when closed to shut off the flow of cooling fluid through the pipe and through the opening 8.

Integral with the casing 7 and extending upwardly around the opening 8 is an annular wall 11 which is provided at its upper edge with a horizontal flange 12 having a plurality of threaded apertures therein. Secured on said flange 12 by machine screws 13 engaged in the threaded apertures therein is a flanged cap 14 in which the thermo-sensitive element for operating the valve 10 is supported. Said thermo-sensitive element comprises a collapsible metallic vessel 15 in which is contained a highly volatile liquid which is sealed therein at such a temperature that the pressure in the vessel is below atmospheric at normal temperatures and the vessel is consequently in collapsed position at such temperatures on account of the difference in internal and external pressure. Said vessel 15 is supported in the cap 14 by means of a screw 16 extending through said cap and through and into a threaded aperture in a boss 17 on the upper end of the vessel 15. A connection between the vessel 15 and the valve 10 is afforded by a link 18 which is connected with the lower end of the vessel by a slip joint connection which is adapted to transmit only the upward or collapsing movement of the vessel and said link 18 is pivotally connected to the valve 10 by means of an apertured boss 19 mounted on said valve above the point of pivotal connection thereof on the transverse shaft 9 and a pin 20 extending through said boss.

On account of the fact that the flow through the casing 7 is from right to left (referring to Figure 2), it will be evident that when the circulating fluid is cool, and the vessel 15 is collapsed, said vessel will be isolated from the pressure of the fluid in the circulating system because of the closure of said valve. In order, however, that the temperature of the fluid in said system may be transmitted to said vessel to expand the same when the proper temperature is reached, a small conduit 21 is provided which leads from the pressure side of the valve 10 to the upper part of the interior of the cap 14. Thus after the engine is started and the cooling fluid is warmed the fluid which is transmitted through said conduit 21 will act to warm the vessel 15 and cause an expansion thereof whereby the valve 10 is allowed to be opened by a spring 25 connected to the upper end thereof and to the bottom of the casing 7, on account of the slip joint connection of the link 18 which is illustrated in Figure 4. When the engine is stopped and the fluid again becomes cool the vessel 15, of course, collapses and the valve 10 is again closed.

It will thus be apparent that this invention provides a simple and efficient means of controlling the flow of a cooling fluid in a circulating system and on account of the fact that the thermo-sensitive element or vessel 15 is isolated from the direct pressure of the fluid in said system, it is possible to construct this vessel to operate with great accuracy.

When a leak occurs in the vessel it is, of course, allowed to expand due to the equalization of the external and internal pressure and the valve 10 immediately is permitted to be moved to an open position of safety by the action of the spring 25.

I am aware that many details of construction may be varied through a wide range without departing from the principles of this invention, and I therefore do not purpose limiting the patent granted otherwise than necessitated by the prior art.

I claim as my invention:

1. In a circulating cooling system for internal combustion engines comprising a water jacket, a radiator, a pump adapted to draw water from the lower part of the radiator and at all times force the entire volume of water passing through the pump into the water jacket, a connection between the water jacket and the upper part of the radiator, a balanced valve in said connection, and a fluid pressure thermostat directly connected to said valve arranged on the radiator side of such valve.

2. In a circulating cooling system for internal combustion engines comprising a water jacket, a radiator, a pump adapted to draw water from the lower part of the radiator and at all times force the entire volume of water passing through the pump into the water jacket, a connection between the water jacket and the upper part of the radiator, a balanced valve device in said connection adapted to allow water to leak through said connection into the radiator when the balanced valve is in closed position, and a fluid pressure thermostat for opening said valve operated by the leakage water arranged on the radiator side of such valve.

3. In a circulating cooling system for internal combustion engines comprising a water jacket, a radiator, a pump adapted to draw water from the lower part of the radiator and at all times force the entire volume of water passing through the pump into the water jacket, a connection between the water jacket and the upper part of the radiator, an opening in said connection, a casing over the opening, a fluid operated thermostat in the opening, and a balanced valve adjacent the opening and operated directly by the thermostat to shut off the flow of fluid through the system and isolate the interior of the casing from the pressure of the fluid in the water jacket.

4. In a circulating cooling system for internal combustion engines comprising a water jacket, a radiator, a pump adapted to draw water from the lower part of the radiator and at all times force the entire volume of water passing through the pump into the water jacket, a connection between the water jacket and the upper part of the radiator, a casing communicating with the circulating system, a fluid operated thermostat in the casing, a pivotally mounted balanced valve operated by the thermostat to shut off the flow of fluid through the system and isolate the interior of the casing from the pressure of the fluid in the water jacket, and means for conducting a limited amount of fluid to the interior of the casing.

In testimony whereof I have hereunto subscribed my name in the presence of two subscribing witnesses.

FREDERICK PURDY.

Witnesses:
CARLTON HILL,
JAMES M. O'BRIEN.